| United States Patent | [11] 3,593,491 |

| [72] | Inventor | Robert N. Tennyson |
| | | Anaheim, Calif. |
| [21] | Appl. No. | 850,306 |
| [22] | Filed | July 24, 1969 |
| [45] | Patented | July 20, 1971 |
| [73] | Assignee | Fluor Corporation |
| | | Los Angeles, Calif. |
| | | Continuation-in-part of application Ser. No. 826,551, May 21, 1969, now abandoned. |

[54] AMMONIA PLANT CARBON DIOXIDE ABSORPTION AND COMPRESSION
1 Claim, 1 Drawing Fig.

[52] U.S. Cl............................................................ 55/43, 55/68
[51] Int. Cl..................................................... B01d 19/00, B01d 53/00
[50] Field of Search........................................... 23/150; 55/36—40, 43, 46, 48, 55, 68, 70; 62/17; 260/555

[56] References Cited
UNITED STATES PATENTS

| 2,926,751 | 3/1960 | Kohl et al. | 55/68 X |
| 2,926,752 | 3/1960 | Redemann et al. | 55/48 X |
| 2,926,753 | 3/1960 | Kohl et al. | 55/48 X |
| 3,121,624 | 2/1964 | Matsch et al. | 55/68 X |
| 3,232,985 | 2/1966 | Cook et al. | 260/555 |
| 3,420,633 | 1/1969 | Lee | 62/17 X |

*Primary Examiner*—Reuben Friedman
*Assistant Examiner*—Richard W. Burks
*Attorney*—White and Haefliger

ABSTRACT: Carbon dioxide is recovered by dissolution in a physical solvent under relatively high contactor pressure which is conserved for purposes of carbon dioxide delivery to a urea plant by incremental or stage pressure reduction of the rich solvent flowing through a succession of separation zones from which their respective gas releases are progressively combined and compressed as feed to the urea reactor.

PATENTED JUL 20 1971 3,593,491
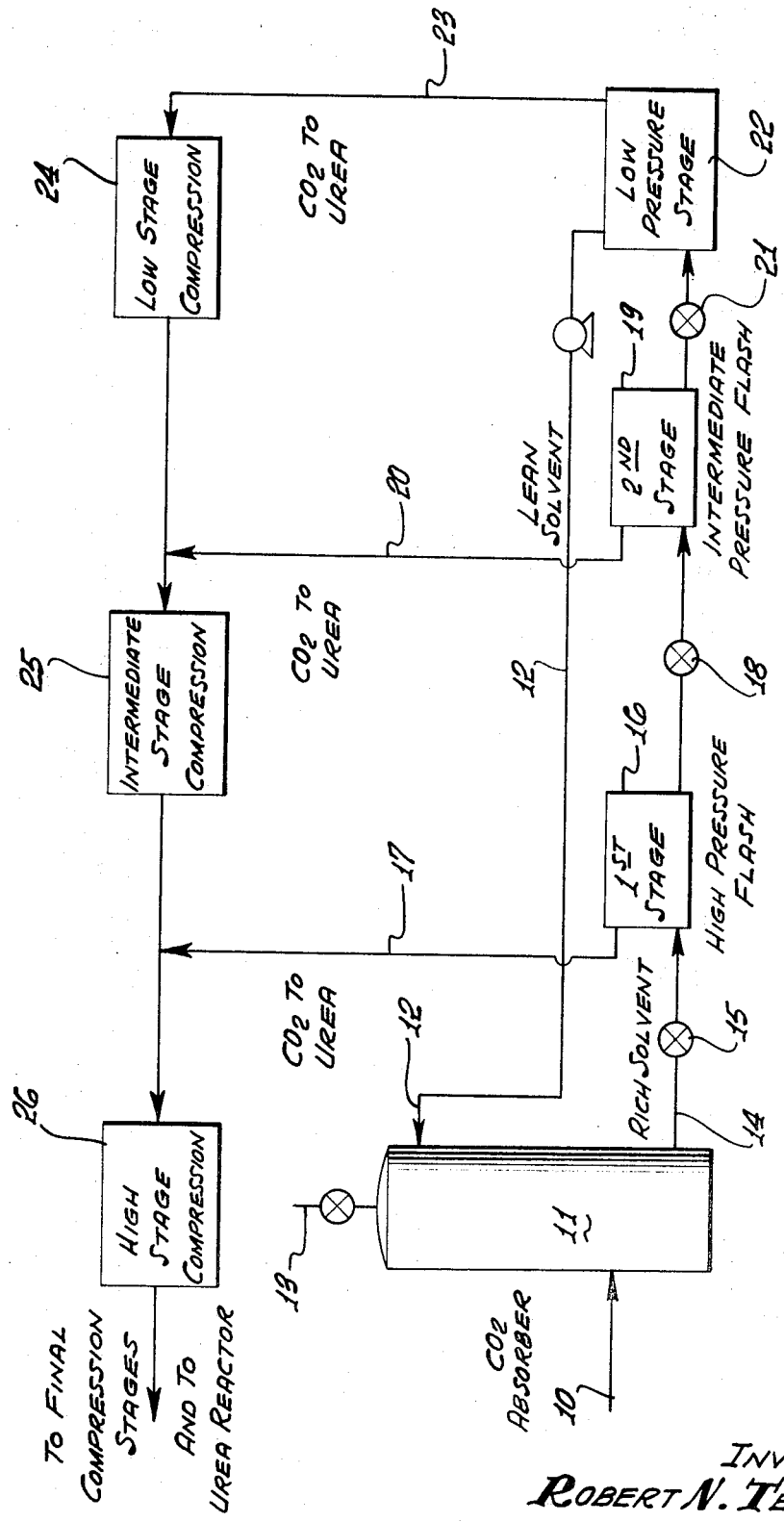
INVENTOR.
ROBERT N. TENNYSON
BY White & Haefliger
ATTORNEYS.

AMMONIA PLANT CARBON DIOXIDE ABSORPTION AND COMPRESSION

This application is a continuation-in-part of Ser. No. 826,551, filed May 21, 1969, under the same title and now abandoned.

BACKGROUND OF THE INVENTION

Several newer processes have been proposed for removing carbon dioxide from gaseous mixtures used in the manufacture of hydrogen and/or ammonia. These processes rely upon physical dissolution of the carbon dioxide in the treating solution, as distinguished from older processes wherein the carbon dioxide reacts chemically with the treating agent, e.g. the amines, and require heating and stripping of rich absorbent for acid gas separation.

The present invention applies to the use of solvents which accept and retain selectively the carbon dioxide by physical dissolution usually under pressures in the range of 300 to 2,000 p.s.i.g. Such solvents are known and include glycerol triacetate, butoxy diethylene glycol acetate, methoxy triethylene glycol acetate, propylene carbonate, and n-methyl-pyrrolidone.

In plant designs employing physical solvents, the dissolved carbon dioxide is flash separated from the solvent by single pressure reduction from the high absorber pressure down to about atmospheric pressure so that for use as feed to a urea reactor the gas must be recompressed, usually to a required pressure higher than the absorber pressure. To my knowledge no recognition has been given the possibilities and horsepower savings of conserving and utilizing a significant part of the absorber pressure potential to correspondingly reduce compression requirements and costs.

SUMMARY OF THE INVENTION

The present invention has for its general object to conserve to an important degree the potential of the absorber pressure for purposes of carbon dioxide recompression by employing incremental or stage reduction of the rich solvent pressure and in so doing to enable the gas to be recompressed from correspondingly incremental pressures significantly above atmospheric pressure, thus to reduce the required recompression pressure differentials and correspondingly the required horsepower.

Preferably the rich absorber solvent is subjected to three-stage pressure reduction ranging from a first relatively high-pressure flash stage through a second intermediate stage and finally to a low-pressure stage maintained at about atmospheric pressure, the carbon dioxide releases from each of the stages being collectively compressed in series for delivery to the urea reactor.

Operation of a typical system in accordance with the invention will be understood from the accompanying drawing showing diagrammatically the components in flow sheet form.

DESCRIPTION OF THE PREFERRED EMBODIMENTS

The raw gas mixture of carbon dioxide, hydrogen and inerts derived from an ammonia plant or a hydrogen synthesis plant and containing typically 48 to 83 percent hydrogen, 16 to 30 percent carbon dioxide and the balance inerts, is fed through line 10 to absorber 11 wherein the gas is intimately contacted with the physical lean solvent of the type previously indicated being returned to the absorber through line 12, the gas and solvent flowing countercurrently within the absorber from which inerts are released overhead through valved line 13 and the rich solvent is released through line 14. Typically the absorber-contactor operates at a pressure in the range of about 300 to 2,000 p.s.i.g.

Leaving the absorber the rich solvent is released past pressure-reducing valve or control 15 into the first stage high-pressure flash chamber 16 from which a portion of the dissolved carbon dioxide is released through line 17 at a pressure that may be in the range of 100 to 800 p.s.i.g. depending upon the relationship to the absorber pressure. Flowing from stage 16 past pressure-reducing control 18 the solvent stream enters the second flash stage 19 maintained typically in the range of 15 to 500 p.s.i.g. and from which the released carbon dioxide is withdrawn through line 20. Finally the solvent is taken past pressure control 21 to the low-pressure stage or chamber 22 from which residual carbon dioxide is withdrawn through line 23 at a pressure in the range of about 1 to 5 p.s.i.g. Lean solvent is pumped and returned to the absorber through line 12.

The low-pressure, intermediate-pressure and high-pressure carbon dioxide releases are compressed sequentially in compressor stages 24, 25 and 26 fed respectively by the progressively increasing pressure releases from the flash stages 22, 19 and 16. Beyond the stage compression 26 the combined carbon dioxide streams going to a urea reactor, not shown, may be further compressed as required for the urea synthesis.

As will be apparent from the foregoing, the required compression ranges in the operation of stages 25 and 26 have been reduced by conservations of the absorber pressure potential at total compression horsepower savings that may range as high as 1,000 or above in a plant wherein ordinarily around 4,000 horsepower would be required to recompress the carbon dioxide resulting from single-stage reduction of the rich solvent pressure from the absorber pressure down to about atmospheric pressure. I claim:

1. The method that includes separating carbon dioxide from a gaseous mixture also containing hydrogen by selectively dissolving the carbon dioxide in a physical solvent within a contactor zone maintained under about 300 to 2,000 p.s.i.g. pressure, flowing the solvent and dissolved carbon dioxide from said zone and incrementally separating the carbon dioxide by passage of the solvent through at least three successive separation zones maintained at progressively reduced pressures resulting in successive carbon dioxide releases from the solvent, the first zone pressure being about 100 to 800 p.s.i.g., the second zone pressure being about 15 to 500 p.s.i.g., and the third zone pressure being about 1 to 5 p.s.i.g., compressing and combining the respective gas releases from said separation zones, delivering the combined compressed gases as feed to a urea reactor and returning the solvent to the contactor zone.